(No Model.) 2 Sheets—Sheet 1.

H. C. ROSS.
UNICYCLE.

No. 459,310. Patented Sept. 8, 1891.

WITNESSES
W. R. Davis
C. Sedgwick

INVENTOR:
H. C. Ross
BY
ATTORNEYS

THE NORRIS PETERS CO., PHOTO-LITHO., WASHINGTON, D. C.

(No Model.) 2 Sheets—Sheet 2.
H. C. ROSS.
UNICYCLE.
No. 459,310. Patented Sept. 8, 1891.
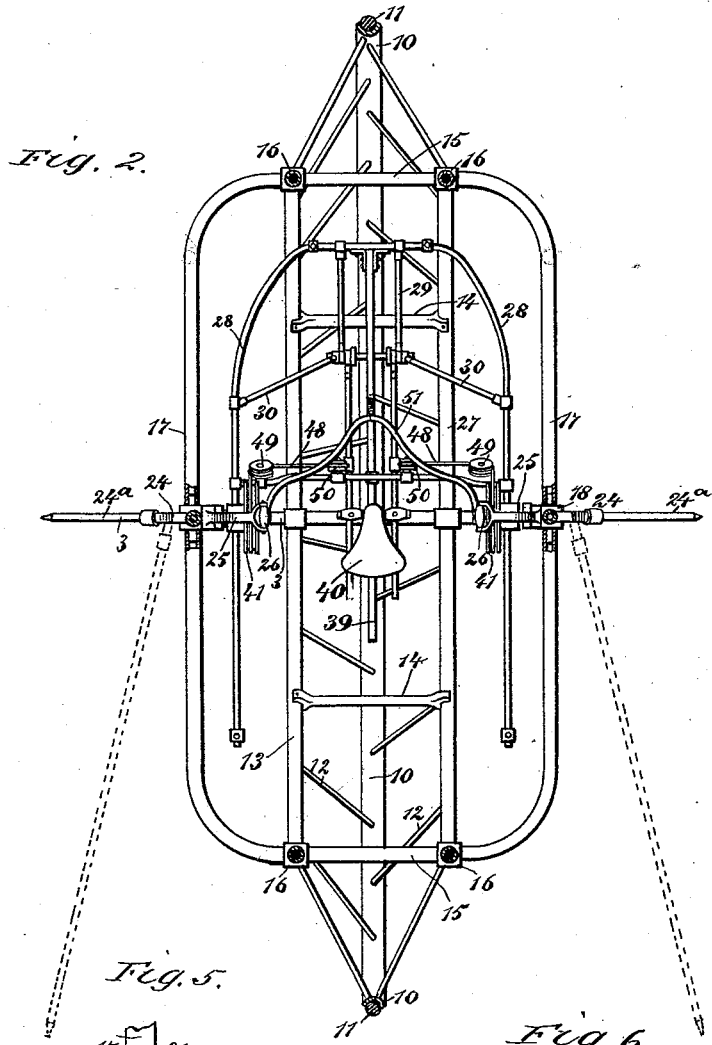
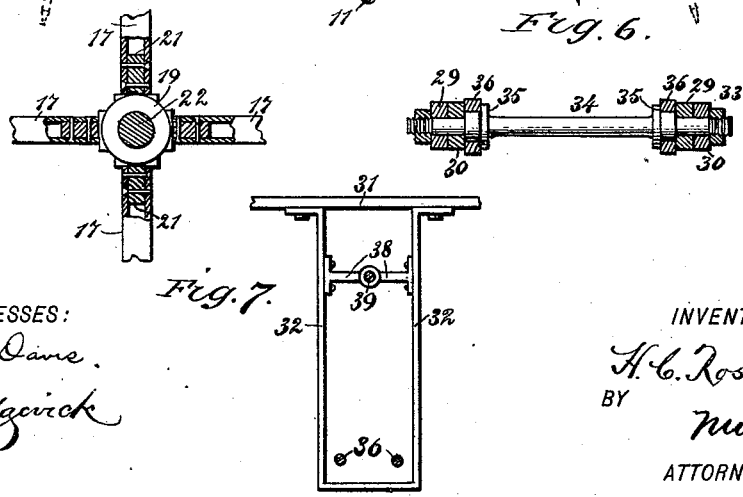
WITNESSES:
W. R. Davis
C. Sedgwick
INVENTOR:
H. C. Ross
BY
ATTORNEYS

UNITED STATES PATENT OFFICE.

HENRY C. ROSS, OF IPAVA, ILLINOIS.

UNICYCLE.

SPECIFICATION forming part of Letters Patent No. 459,310, dated September 8, 1891.

Application filed April 21, 1891. Serial No. 389,784. (No model.)

*To all whom it may concern:*

Be it known that I, HENRY C. ROSS, of Ipava, in the county of Fulton and State of Illinois, have invented a new and Improved Unicycle, of which the following is a full, clear, and exact description.

My invention relates to improvements in unicycles; and the object of my invention is to produce a machine with a single wheel, which may be easily and rapidly propelled and which may also be safely ridden.

To this end my invention consists in a unicycle constructed substantially as will be hereinafter described and claimed.

Reference is to be had to the accompanying drawings, forming a part of this specification, in which similar figures of reference indicate corresponding parts in all the views.

Figure 1 is a side elevation of the unicycle. Fig. 2 is a sectional plan view of the same. Fig. 3 is an enlarged detail vertical section of one of the hubs and the connection between the hub and the inner frame. Fig. 4 is an enlarged sectional view of one of the ratchet attachments for the hubs. Fig. 5 is a broken detail sectional view of one of the hubs, showing the connection between it and the side arms of the wheel. Fig. 6 is an enlarged detail sectional view of the support for the pedal-levers and the braces of the inside frame, and Fig. 7 is a detail view of the U-shaped frame which supports the seat-perch and limits the movements of the pedal-levers.

The main portion of the machine consists of a large single wheel having a rim 10, which is provided with a suitable rubber tire 11, and extending inward from the rim are diverging spokes 12, which spokes are secured to inner parallel rims 13, which rims are circular and are connected and strengthened by suitable braces 14 and 15. The braces 14 are simply clamped to the rims, and the braces 15 are secured in clips 16, which clips are secured to the rims, and the clips also support the ends of curved arms 17, which arms are bent outward and extend diametrically across each side of the wheel, there being four arms on each side, and at the intersection of these arms are the hubs 18 of the wheel, each hub comprising a sleeve 19, which sleeve is provided at each end with a ball-bearing 20, and the outer end of the sleeve terminates in radially-extending lugs 21, which enter the arms 17 and are securely bolted thereto. An axle 22 extends through the sleeve 19, and the sleeve will turn easily on the axle, owing to the ball-bearings. The inner end of each axle is squared, as shown at 23, and the outer end is bent laterally and screw-threaded, as shown at 24. The outer ends of the axle are adapted to enter sockets in the upper ends of rods or tubes 24$^a$, which rods or tubes are long enough to extend to the ground and terminate in tempered points. It will thus be seen that when the axles are turned into a position to bring the points of the rods or tubes into the ground the wheel will be maintained in a stationary position, and if the rods or tubes are arranged so as to drag or touch lightly upon the ground they will serve as brakes.

Mounted on each of the sleeves 19 is an arm 25, which extends above and below the sleeve and has its ends bent inward, as best shown in Fig. 3, and each arm is mounted on a sleeve in a ball-bearing so as to prevent friction, and is held in place by a suitable collar. The upper ends of the arms 25 terminate in handles 26, which are grasped by the hands of the rider and by means of which the wheel is guided, as hereinafter described, and the lower ends of the arms are perforated horizontally and support the frame 28, the sides of which pass through said perforations. This frame 28 is of an approximately U shape, with the bent portion in the front part of the wheel, and provided with the depending side braces 29 and 30, which are arranged at the front portion of the frame, the cross-bar 31, which connects the opposite sides of the frame 28, and a depending U-shaped frame 32, which is secured to the cross-bar 31 and which serves as a support for the seat-perch and also limits the movement of the pedal-levers. The braces 29 and 30, which are arranged on each side of the frame 28 and near the front end of the same, extend diagonally downward from the frame 28, and are pivoted, as shown as 33, on an axle 34, which axle has collars or shoulders 35 near each end, and serves also as a pivot for the pedal-levers 36, which extend rearwardly from said axle and through the U-shaped frame 32, as best shown in Figs. 1 and 7. The forward ends of the pedal-levers and the lower ends of the braces 29 and 30 are held in place by suitable nuts, which are secured on the threaded ends of the axle 34. The pedal-levers 36 extend rearward, as described, and each lever is provided with a pedal 37, any approved form of pedal being used. A curved bar or perch 39 is pivoted on the front portion of the U-shaped frame 28 and extends rearward through the center of a cross-bar 38, which cross-bar connects the two sides of the U-shaped frame 32, and the rear end of this perch supports the seat 40, which may be of any suitable description.

On each side of the machine is a ratchet mechanism for driving the wheel, which consists of a hollow circular case 41, which is mounted loosely on the inner end of the axle 22 and sleeve 19. A ratchet-wheel 42 is secured to the sleeve 19 within the case 41. Pawls 43 engage the teeth of the ratchet-wheel, said pawls being pivoted on the inner wall of the case 41. A main spring 44 is provided, one end of which is secured to the case, as shown at 45, and the inner end of which is fixed to a collar 46, which collar is secured tightly on the axle 22, and 48 is a strap for turning the case. The case 41 is provided with a groove 47 in its face, and each case is provided with a strap 48, which is held in the groove and one end of which is secured to the case.

On each side of the machine, a little below and a little in advance of the case 41, is a grooved pulley 49, which is pivoted to the arm 32ª, mounted on cross-bar 32, and the outer face of which pulley aligns with the groove 47 in the case 41. Guide-pulleys 50 are also pivited to the cross-bar 31, being held in suitable supports on the cross-bar, and these pulleys 50 are arranged above each side of the U-shaped frame 32. The straps 48 of the ratchet-cases extend downward over the pulleys 49 and 50, and thence down to the pedal-levers 36, to which they are secured. The pedals and levers are alternately operated, and when a lever is depressed it will pull downward on one of the straps 48, and this will turn the ratchet-case 41, and the pawls 43, which are in engagement with the ratchet-wheel 42, will turn said ratchet-wheel and sleeve 19, to which it is affixed, thus imparting movement to the main wheel, and when the pressure is removed from the pedal the spring 44 will reverse the movement and raise the pedal-lever. This ratchet mechanism I do not claim in detail as a part of my invention, as it is similar to the ordinary ratchet mechanism for propelling bicycles.

A curved brake-rod 51 is secured at its ends to the squared ends 23 of the axles 22, and the rod is arranged at a convenient point and in front of the seat 40, so that it may be easily reached and operated by a rider. The rod is normally pressed downward by a spring 52, one end of which is secured to the upper central portion of the rod and the lower end of which is secured to the perch 39, and when the rod is bent downward in this way it will raise the rods or tubes 24ª from the ground; but when the rod is raised, as shown in Fig. 1, it will tilt the axles 22 and throw the rods or tubes 24ª downward, so that their points will stick into the ground.

A mud-guard 53 is arranged above the seat, its lower end being secured to the rear ends of the bent rod 28 and the upper end of the guard being connected by means of rods 54 with the forward portions of said bent rod. The mud-guard is preferably made of perforated cloth; but it may be made of wire or with any suitable material which will shield the rider from mud, but which will allow the wind to pass through without too much resistance.

To operate the machine, the rider places himself upon the seat 40 between the two hubs 18, and with his hands grasps the handles 26 of the arms or handle-bars 25, and then by bearing with his feet alternately upon the pedals 37 the levers 36 will be operated and the ratchet mechanism connected with the levers will impart a rotary movement to the wheel. When the machine is to be stopped or slowed, the rider tilts the curved rod 51, so as to bring the lower ends of the rods or tubes 24ª into contact with the ground, and to steer the machine he twists upon the handled bars 25 by means of the handles 26, and the wheel may thus be turned so as to give it a desired direction.

Having thus described my invention, I claim as new and desire to secure by Letters Patent—

1. A unicycle comprising a wheel formed of the main rim 10, the smaller rims 13 13 at opposite sides thereof, the braces connecting the side rims and the spokes 12 connecting the main and side rims, the cross-arms 17 17, secured at their outer ends to the respective side rims and having hubs at their centers or points of intersection, a seat, and operating mechanism suspended from said hubs, substantially as shown and described.

2. A unicycle comprising a wheel formed of the main rim 10, the smaller rims 13 13 at opposite sides thereof and connected therewith by spokes 12, the clips 16 on the smaller rims, the braces 15, secured in the adjacent inner ends of said clips, the curved cross-arms 17 17, connected at their curved outer ends to the outer sides of the clips and at their inner ends to radial projections 21 on central hubs 18, the seat, and operating mechanism suspended within the wheel from said hubs, substantially as shown and described.

3. A unicycle the wheel of which is provided with hubs having inward-extending sleeves, collars having ball-bearings on said sleeves, a frame suspended horizontally from said sleeves and carrying the seat, and operating mechanism, substantially as shown and described.

4. A unicycle comprising a main wheel having two hubs secured thereto and provided with inward-projecting sleeves having loose collars thereon, a ratchet mechanism for turning the hubs, a horizontal U-shaped frame suspended from the collars on said hubs and supporting a seat, pedal-levers pivoted in the frame and extending beneath the seat, and straps connecting the pedal-levers with the hub-ratchet mechanism, substantially as described.

5. In a machine of the character described, the combination, with a main wheel having a hub on each side, of axles extending through the hubs and having their outer ends bent laterally, rods or tubes secured to the bent ends of the axles and having pointed lower ends to contact with the ground, and a brake-rod connecting the inner squared ends of the axles, and the spring 52, normally pressing the said rod downward to hold the rods or tubes raised, substantially as described.

6. In a machine of the character described, the combination, with a main wheel having a hub on each side, of arms or handle-bars having collars between their ends rocking loosely on the hubs, said arms having their upper ends provided with steering-handles, a frame suspended from the lower ends of the arms, and a seat supported by the frame, substantially as described.

7. The combination, with a main wheel having a hub on each side and ratchet-wheels secured to the hubs, of arms provided between their ends with collars having ball-bearings on the hubs, said arms being at upper ends provided with steering-handles, a frame suspended from the lower ends of arms and carrying a seat, pedal-levers pivoted in the frame and arranged beneath the seat, and a strap extending over suitable guide-pulleys and connecting the ratchet mechanism of the hubs with the pedal-levers, substantially as described.

8. The combination, with the wheel having hubs provided with inward-extending sleeves, of the loose collars on the sleeves provided with depending arms 25, the horizontal U-shaped frame 28, extending through the lower ends of said arms, the depending braces 29 30, the cross-bar or axle 34 at the lower ends of said braces, the cross-bar 31, connecting the sides of frame 28, the bracket or frame 32, depending from said cross-bar, the treadles extending through said frame 32 and pivoted at their front ends on the bar or axle 34, and the operating-ratchets connected with said treadles, substantially as shown and described.

9. In a machine of the character described, the combination, with the seat-frame, of a perforated mud-guard secured to the frame and arranged above the seat, substantially as described.

HENRY C. ROSS.

Witnesses:
 FRANK C. ROSS,
 WILLIAM R. BABCOCK.